(12) United States Patent
Hattori et al.

(10) Patent No.: US 12,255,429 B2
(45) Date of Patent: Mar. 18, 2025

(54) CARBON GROUNDING BRUSH

(71) Applicant: TRIS INC., Matsusaka (JP)

(72) Inventors: Taisuke Hattori, Matsusaka (JP); Yuma Fukuta, Matsusaka (JP)

(73) Assignee: TRIS INC, Matsusaka (JP)

( * ) Notice: Subject to any disclaimer, the term of this patent is extended or adjusted under 35 U.S.C. 154(b) by 173 days.

(21) Appl. No.: 18/018,285

(22) PCT Filed: Jul. 6, 2021

(86) PCT No.: PCT/JP2021/025432
§ 371 (c)(1),
(2) Date: Jan. 27, 2023

(87) PCT Pub. No.: WO2022/024682
PCT Pub. Date: Feb. 3, 2022

(65) Prior Publication Data
US 2023/0299547 A1    Sep. 21, 2023

(30) Foreign Application Priority Data
Jul. 31, 2020   (JP) .................. 2020-130285

(51) Int. Cl.
*H01R 39/64*    (2006.01)
*B60R 16/06*    (2006.01)

(52) U.S. Cl.
CPC ............. *H01R 39/64* (2013.01); *B60R 16/06* (2013.01); *H01R 2201/26* (2013.01)

(58) Field of Classification Search
CPC .... H01R 39/64; H01R 2201/26; H01R 39/56; H01R 39/26; H01R 39/36; B60R 16/06

USPC .................................. 361/212, 220
See application file for complete search history.

(56) References Cited

U.S. PATENT DOCUMENTS

| | | | |
|---|---|---|---|
| 5,354,607 A * | 10/1994 | Swift .................. | G03G 15/75 428/338 |
| 2017/0163131 A1* | 6/2017 | Nishio .................. | H02K 13/10 |
| 2018/0159286 A1* | 6/2018 | Katona .................. | H01R 39/06 |
| 2022/0006367 A1* | 1/2022 | Roman .................. | H01R 39/56 |

FOREIGN PATENT DOCUMENTS

| | | |
|---|---|---|
| JP | 51-154304 U | 12/1976 |
| JP | 59-99669 U | 7/1984 |
| JP | 61-74269 U | 5/1986 |
| JP | 63-218179 A | 9/1988 |
| JP | 2018-167653 A | 11/2018 |

OTHER PUBLICATIONS

Official Communication issued in International Patent Application No. PCT/JP2021/025432, mailed on Sep. 14, 2021.

* cited by examiner

*Primary Examiner* — Danny Nguyen
(74) *Attorney, Agent, or Firm* — Keating & Bennett, LLP

(57) ABSTRACT

A carbon grounding brush has a sliding surface that slides on and grounds a driving shaft transmitting driving force and exposed to an insulating liquid. A slit is provided on the sliding surface, and at least one end of the slit is located on one side of the sliding surface. The slit introduces into the slit the insulating liquid pressed towards the sliding surface by the rotation of the driving shaft and discharges the insulating liquid from the one end of the slit. Thus, the contact resistance between the driving shaft and the sliding surface is made small, and electrical corrosion and electromagnetic noises are reduced.

7 Claims, 4 Drawing Sheets

CARBON GROUNDING BRUSH

The present invention relates to a carbon grounding brush to slide on a driving shaft that transmits driving force and is exposed to an insulating liquid.

BACKGROUND ART

Various power transmission mechanisms of mechanical devices transmit driving power through driving shafts, gears, and so on, for transmitting propulsive power or generating electricity by generators. Regarding power transmission mechanisms, electric currents are generated in the system, either intended or unintended, and cause problems.

In automatic transmissions (AT) of motor vehicles, one type of power transmission mechanism, the driving shafts transmit the driving force from the driving sources, such as motors or engines, to the driving wheels and are exposed to ATF (Automatic Transmission Fluid). If the driving shafts are not adequately grounded, currents (either intended or unintended) are generated in the AT systems and the potential difference between the driving shafts and other parts of AT generated by the currents causes electrical corrosion, electromagnetic noises, and so on.

When a grounding brush is made slid on the driving shaft of AT, ATF is made entered between the brush and the driving shaft, and the contact resistance between them is increased. In particular, the contact resistance is increased rapidly from a certain rotational velocity when the rotational velocity is increased.

A related piece of the prior art is indicated. Patent Document 1 (Japanese Utility Model Sho 61-74269) discloses grooves on a brush surface of an electric motor. The grooves are provided on the brush surface that slides on the commutator. While the commutators of electric motors are cylindrical in general, the sliding surfaces of brushes sliding on the commutators and so on, are flat when manufactured. Therefore, the brushes are made deformed so that their sliding surfaces fit with the commutator surfaces. According to Patent Document 1, the grooves provided on the brush surface make the sliding surface worn early and shorten the period needed for the deformation.

PRIOR ART DOCUMENT

Patent Document

Patent Document 1: Japanese Utility Model Sho 61-74269

SUMMARY OF THE INVENTION

Problem to be Solved by the Invention

The object of the invention is to provide a carbon grounding brush that gets away electric current, with a small contact resistance, from a driving shaft for transmitting the driving force and exposed to an insulating liquid in a mechanical device such as an AT.

Means for Solving the Problem

The carbon grounding brush according to the invention has a sliding surface configured to slide on and ground a driving shaft that transmits driving force and is exposed to an insulating liquid. The carbon brush is characterized in that said sliding surface is provided with at least a slit, that at least one end of said slit is extended to at least one side of the sliding surface, and that the slit is configured to introduce into the slit the insulating liquid pressed by rotation of the driving shaft towards the sliding surface and discharge the insulating liquid from the one end.

Since the slit according to the invention is not for deforming the sliding surface of the brush to fit with a commutator or the like, it is preferable that the slit is present during the service life of the brush. Therefore, the slit has preferably a depth not less than the effective length of the brush. Here, the effective length of the brush means the length to wear during the service life of the brush (for example, the mileage of an electric vehicle during its service life). When the depth of the slit is not less than the effective length of the brush, adequate grounding is maintained during the service life of AT or the mechanical device in which the brush is used.

The inventors have estimated the effective length of the brushes and found that the effective length of the brushes is 18 mm at a car mileage of 300,000 km and 0.5 mm at 10,000 km. Therefore, the slit is in its depth, for example, not less than 0.5 mm, preferably 3 to 20 mm, and, in particular, 10 to 20 mm.

The slit according to the invention discharges the insulating liquid pressed into the sliding surface due to the rotation of the driving shaft. As the driving shaft rotates, the insulating liquid is pressed between the sliding surface and the driving shaft, and the carbon brush tends to imperfectly ground the driving shaft. According to the invention, however, the insulating liquid pressed into the sliding surface is introduced into the slit and discharged from the edge of the slit to the outside of the carbon brush. Therefore, the driving shaft is grounded securely when the driving shaft rotates. In particular, the increase in contact resistance between the sliding surface and the driving shaft is reduced when the driving shaft rotates at a high velocity.

The object of the invention is achieved when at least one slit is provided at least at one portion of the sliding surface of the brush. For example, if the sliding surface is rectangular, it is enough to provide one slit facing one side of the rectangle. The slit may not reach another side of the sliding surface. In other words, the slit does not have to reach from one periphery of the sliding surface of the brush to another periphery. The slit may be opened where the slit reaches two different sides of the sliding surface or semi-closed where only one end of the slit reaches one side of the sliding surface. Both an open-end slit and a semi-closed slit may be provided. When the slit is opened, the insulating liquid (fluid) forming an oil film on the sliding surface is easily discharged, and, therefore, the insulating liquid (fluid) is prevented from forming the insulating film. Furthermore, the slits may have three or more openings. For example, if the slits are in a grid pattern, the insulating liquid (fluid) is easily discharged from the sliding surface.

Preferably, the insulating fluid is ATF (automatic transmission fluid) in AT (automatic transmission) of an automobile. The driving shaft to be grounded is the power transmission shaft of AT exposed to ATF. However, the brush according to the invention may be used for arbitrary usages.

The carbon material for the carbon grounding brush according to the invention is electrically conductive, in powder form, and capable of forming a sintered body. The carbon material is for example graphite, and artificial graphite and/or natural graphite may be used, but it can be coke, carbon black, activated carbon, charcoal, coal, and so on. In addition to carbon, the brush may include a metallic powder, such as copper powder, silver powder, copper alloy powder such as brass powder, tin powder, or mixtures of these powders. The species, the average particle size, and the content of the metallic powder are arbitrary.

Advantageous Effects of the Invention

The carbon grounding brush according to the invention reduces electric corrosion of the driving shaft and so on and noises such as electromagnetic noises from the driving shaft, by discharging the electric charge generated on the driving shaft. According to the invention, insulating liquid pressed into the sliding surface by the driving shaft is discharged through the slit. As a result, the contact resistance between the driving shaft and the sliding surface is reduced and the electrical corrosion and the electromagnetic noises are also reduced. These advantageous effects of the invention appear clearly when the driving shaft is rotated at a high velocity so that the insulating liquid is strongly pressed into the sliding surface.

THE BEST MODE FOR CARRYING OUT THE INVENTION

The best embodiments for carrying out the invention will be described. The invention is not limited to the embodiments, the scope of the invention shall be determined based on the claims, and the embodiments may be modified with reference to known technical matters.

Embodiments

Figure 1:
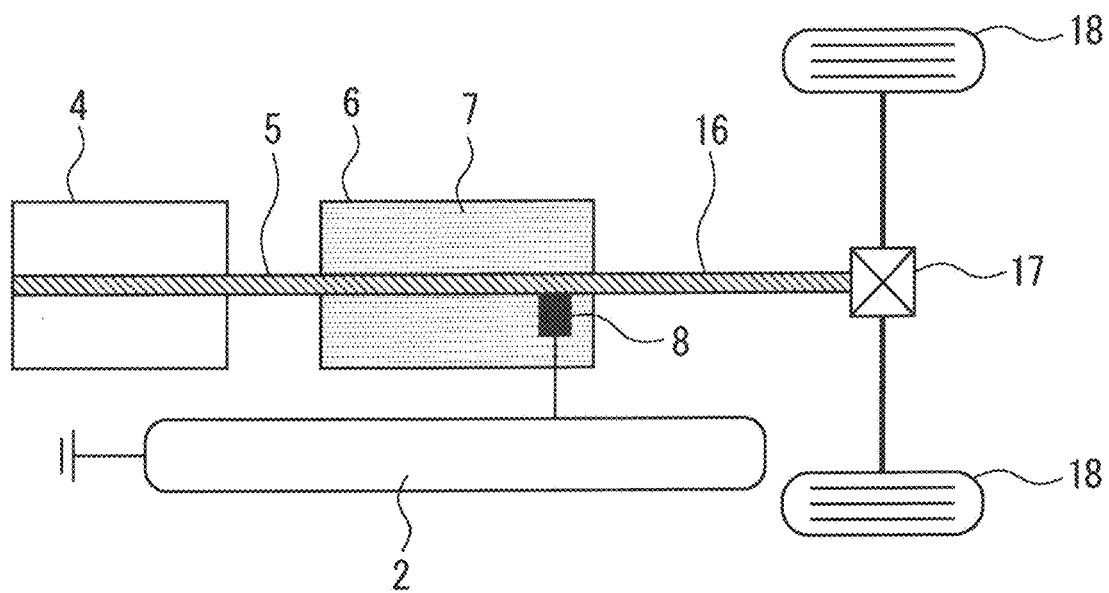
FIG. 1: A schematic diagram indicating the environment where the brushes according to the embodiments are used.

FIGS. 1 to 8 illustrate the embodiments of the present invention and their modifications. FIG. 1 shows an electric motor vehicle provided with a carbon grounding brush 8 according to the embodiments (simply "brush 8" or "brush" in the following). Indicated by 2 is the chassis of the electric motor vehicle, where a crankshaft 5 is connected to the main motor 4 and extends through the automatic transmission (AT 6) for driving the output shaft 16. The output shaft 16 drives the driving wheels 18 through a differential gear 17. In AT 6, ATF (automatic transmission fluid) is contained, and a driving shaft 14 is exposed to ATF in AT 6. The brush 8 grounds the driving shaft 14 in AT 6 to the chassis 2. The vehicle is preferably an electric vehicle but may be a hybrid, gasoline, diesel, or diesel vehicle.

Figure 2:
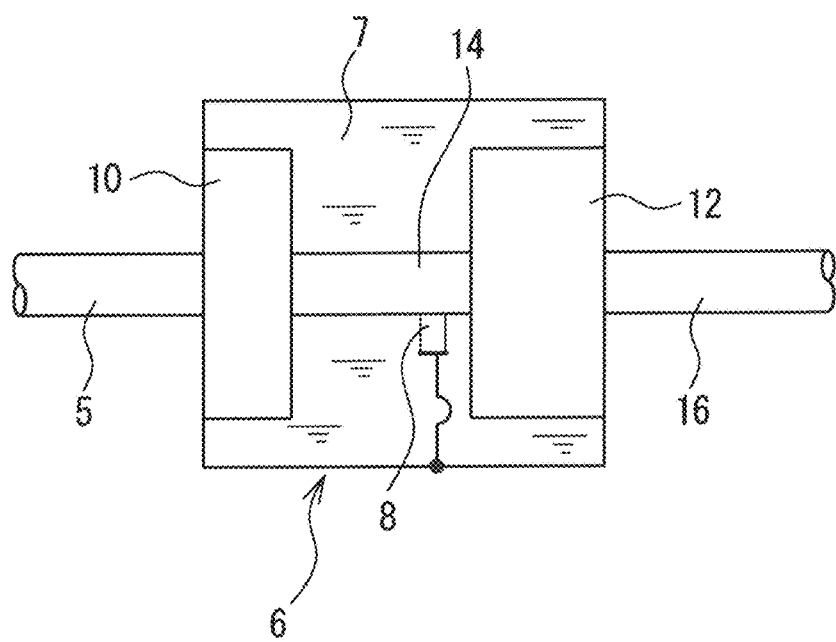
FIG. 2: A schematic diagram indicating an AT with a brush according to the embodiments.

FIG. 2 shows an example of AT 6. The crankshaft 5 is connected via torque converter 10 to the driving shaft 14 in AT 6, and the driving shaft 14 drives the output shaft 16 via a transmission 12. The driving shaft 14 is constantly exposed to ATF 7 and is wetted by ATF on its surface. Because of the torque converter 10, transmission 12, and ATF 7, the driving shaft 14 is imperfectly grounded. Therefore, the driving shaft is easily charged by static electricity and so on and can cause electric corrosion and electromagnetic noises if not adequately grounded.

FIGS. 3 to 6 show four types of sliding surfaces of the brushes according to the embodiments, and they are exemplary. In brush 8 of FIG. 3, two horizontal slits 21 and two vertical slits 21, for example, are provided on the sliding surface 20 of the brush in a grid pattern, and the sliding surface 20 is divided into nine convex portions 22, for example, by the slits 21.

Figure 4:
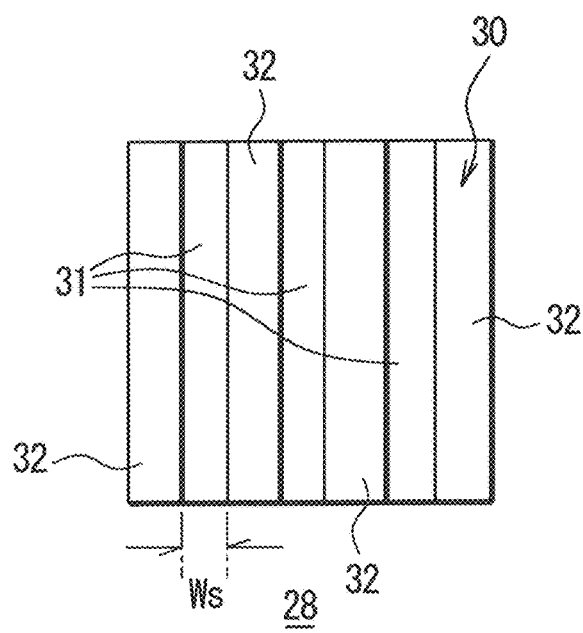
FIG. 4: A diagram indicating the sliding surface of the brush according to the second embodiment.

The brush 28 of FIG. 4 is provided with three slits 31, for example, in parallel to the rotational direction of the driving shaft 14 (the circumferential direction on the circumference of the shaft 14), and the sliding surface 30 is, for example, divided into four convex portions 32. The longitudinal direction of the slits 31 may be oblique or orthogonal to the rotational direction of the driving shaft 14.

Figure 5:
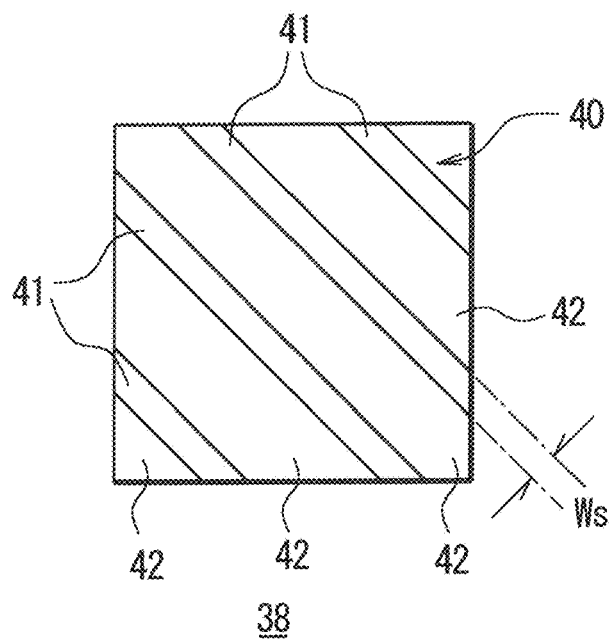
FIG. 5: A diagram indicating the sliding surface of the brush according to the third embodiment.
Figure 6:
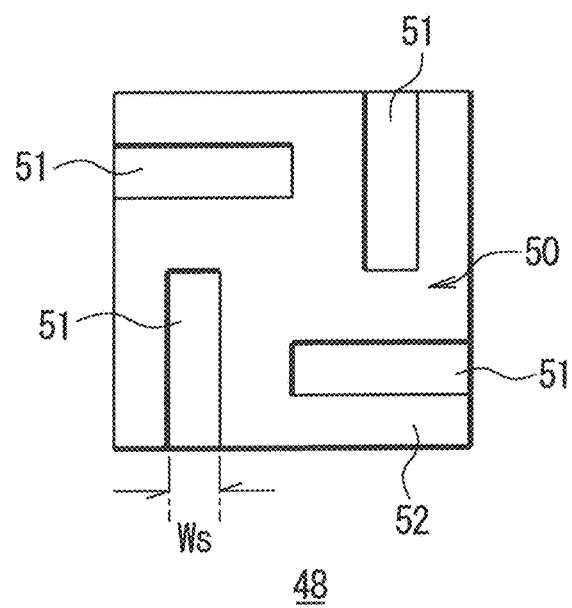
FIG. 6: A diagram indicating the sliding surface of the brush according to the fourth embodiment.

The brush 38 of FIG. 5 is provided with, for example, four slits 41 at an angle of 45 degrees to the rotational direction of the driving shaft 14, and the sliding surface 40 is divided into, for example, five convex portions 42.

Figure 3:
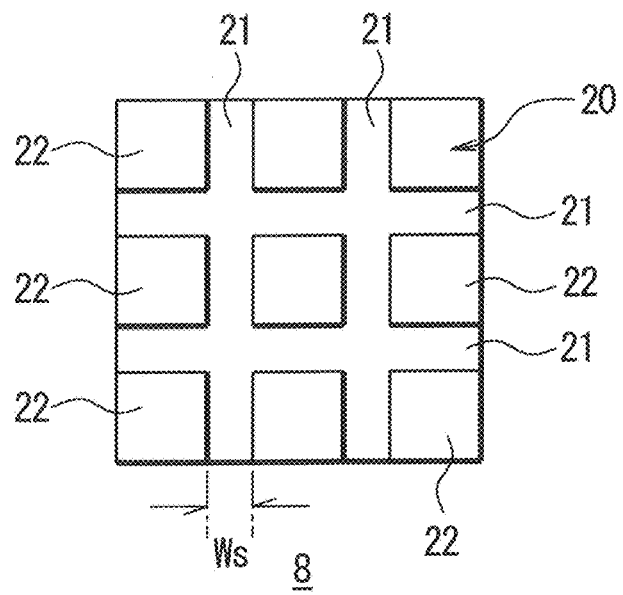
FIG. 3: A diagram indicating the sliding surface of the brushes according to the embodiment.

In brushes 8, 28, and 38 of FIGS. 3 to 5, slits 21, 31, and 41 are on the sliding surfaces 20, 30, and 40, extending to the two sides of the sliding surface. As a result, ATF in the slits 21, 31, and 41 is easily discharged from sliding surfaces 20, 30, and 40. For this reason, as shown in FIGS. 3 to 5, brushes with slits or a slit extending to two different sides of the sliding surface are preferred. In particular, the grid-shaped slits 21 of FIG. 3 are particularly desirable since they discharge ATF from the convex portions 22 in a short distance. In brush 48 of FIG. 6, for example, the four slits 51 are all semi-closed and oriented in different directions, for example, by 90 degrees. Each slit 51 intersects only one side of the sliding surface 50, and the convex portion 52 of the sliding surface 50 is not divided. The slits 51 intersect in total with the four sides of the sliding surface 50. It is preferable that the slit intersects at least two sides of the sliding surface. The slits 21, 31, 41, and 51 are one to six in number and, preferably, three to five.

Figure 7:
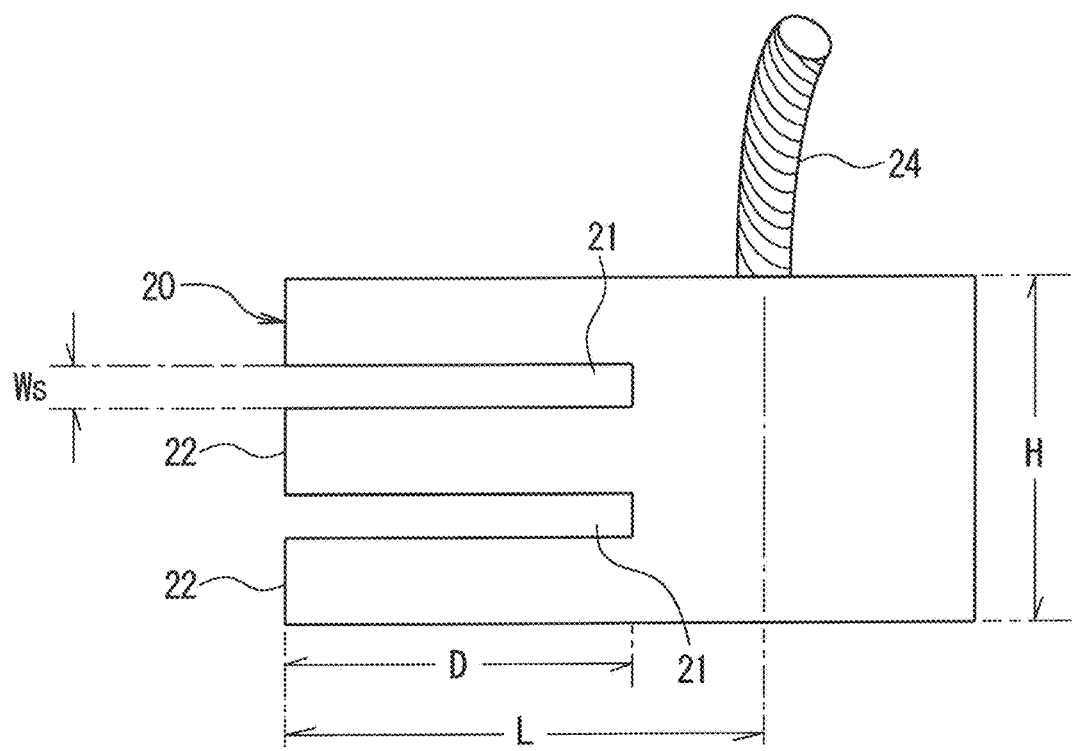
FIG. 7: A side view of the brush of FIG. 3.
Figure 8:
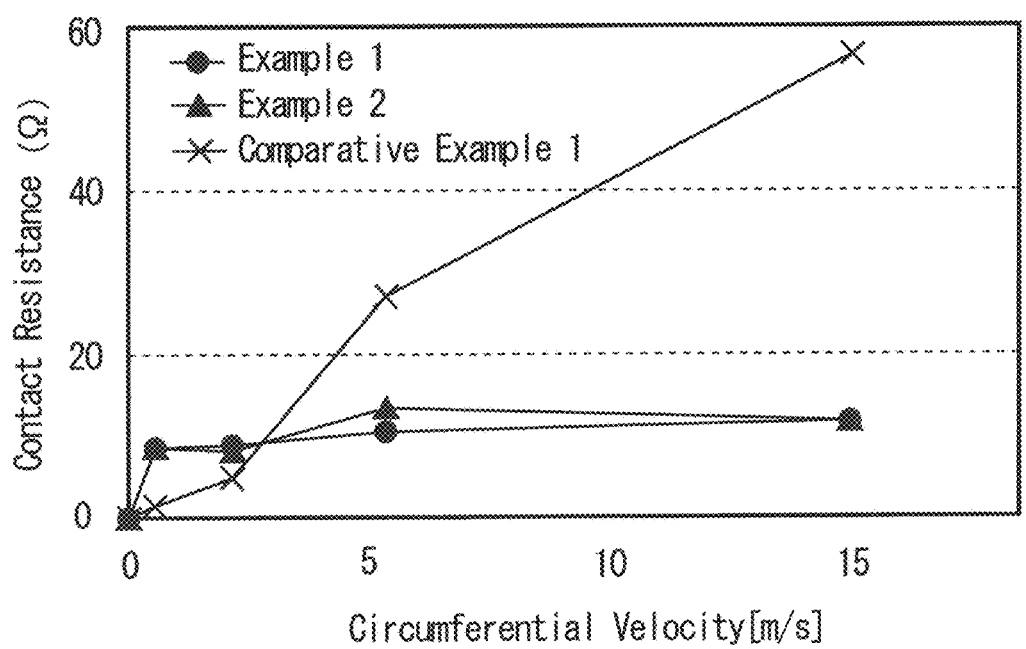
FIG. 8: A characteristic diagram of the brushes according to the embodiments.

FIG. 7 shows one side of brush 8. Lead wire 24 is fixed to brush 8 on a side away from the sliding surface 20. The sliding surface 20 is square, for example, and the length of each side of the sliding surface is H. However, the sliding surface of brush 8 may be rectangular or other quadri-lateral. The distance from the sliding surface 20 to the center of the connection portion of the lead wire 24 is L, and the depth of the slit 21, that from the sliding surface 20 to the bottom, is D. Since the slit 21 should be present during the service life of the brush 8, its depth D is preferably longer than the effective length of the brush 8.

The ratio of the area of the slits to the total area of the sliding surface is about 1/3 in the embodiments of FIGS. 3 to 6, for both securing the contact area between the driving shaft and the brushes and discharging easily ATF from the sliding surface. The preferred range of the ratio is between 20% and 40%, and more preferably between 25% and 40%. The total area of the sliding surface means the total area of the slits and the convex portions.

The width ws of slits 21, 31, 41, and 51 means one perpendicular to the longitudinal direction of the slits. For easy processing and making the distance between the slits narrow, the width ws is preferably not less than 0.2 mm and not more than 1 mm, and particularly not less than 0.4 mm and not more than 0.8 mm. The depth D of slits 21, 31, 41, and 51 is preferably not less than 0.5 mm, for example, not less than 3 mm and not more than 20 mm, and, more particularly, not less than 10 mm and not more than 20 mm.

Brush 8 and so on, excluding the lead wire 24, contains carbon, such as natural graphite, artificial graphite, coke, carbon black, activated carbon, coal, charcoal, etc., and graphite is particularly preferred. Brush 8 and so on, excluding the lead wire 24, may contain, in addition to carbon, metals such as Cu, Al, Mg, Fe, Ag, Au, Ni, Sn, Zn, and so on.

Example of Manufacture of Brush 8, Etc.

Scaly natural graphite was treated with a binder and pulverized by an impact-type milling machine, and 80 mesh pass graphite powder was obtained. The material powder was fed into a mold from a hopper, the tips of the lead wire were buried, and the mold was press-formed. The brushes were then sintered at 700° C. in an electric furnace in a reducing atmosphere and machined to produce the brushes shown in FIGS. 3 to 6. The size of the brush was 10 mm in length in a direction perpendicular to the sliding surface, 7 mm to a position where the lead wire was attached, and the sliding surface was a square of 5 mm×5 mm. The sliding surface is a square of 5 mm×5 mm. The brush 8 and so on, were provided with the slits 21 and so on, by cutting. Each slit had a width ws of about 0.6 mm and a depth D of 5 mm.

The contact resistances with the driving shaft 14 were measured for brush 28 of FIG. 4. The slit width ws was about 0.6 mm, the depth D was about 5 mm, and the convex portions 32 had a width of about 0.8 mm. The brush 8 of FIG. 3 had smaller contact resistances than that of FIG. 4 in high-velocity rotation ranges. Brush 28 is brought into contact with the driving shaft 14 in AT 6 of a commercial automobile by a spring not shown in the figure. The rotational velocity of the driving shaft 14 was varied, and the contact resistances were measured. In Example 1, the longitudinal direction of slits 21 was parallel to the rotational direction of driving shaft 14, and in Example 2, they were at the right angle. The comparative example had a flat sliding surface without the slit 31 and had the same composition and manufacturing conditions as in Examples 1 and 2. The difference was only the presence of slit 31. In addition, a durability test was conducted until the brush 28 was worn down to about 4 mm, but no damage such as chipping of the convex portions 32 was observed. The results are indicated in Table 1 and FIG. 8.

TABLE 1

| | Contact resistance (ohm) | | | | |
|---|---|---|---|---|---|
| Circumferential velocity* (m/s) | 0 | 0.4 | 2 | 5.2 | 15 |
| Example 1 | 0.4 | 8.3 | 8.6 | 10.7 | 11.8 |
| Example 2 | 1.3 | 8.8 | 8.2 | 13.6 | 12.0 |
| Comparative Example | less than 0.1 | 1.5 | 5.0 | 27.5 | 55.6 |

*A circumferential velocity of 1 m/s corresponds to 1000 rpm of the motor shaft.

The contact resistances of both Examples 1, 2, and the comparative example were small up to the circumferential velocity of 2 m/s, but from 5.2 m/s, the contact resistance of the comparative example rapidly increased. The contact resistance of 27.5 ohms is normally considered incomplete for grounding. In contrast, the contact resistances of Examples 1 and 2 were within an allowable range up to a circumferential velocity of 15 m/s (the highest velocity). In addition, the dependence of contact resistances on the differences between the directions of the slits and the rotational direction was small.

The embodiments of brushes that ground a driving shaft in an automobile AT have been described. However, they may be used for grounding motor shafts, axles of vehicles, axles of axial-flow liquid pumps, and so on, for grounding driving shafts exposed to insulating liquid.

DESCRIPTION OF REFERENCE SIGNS

2: Chassis
4: Motor
5: Crankshaft
6: AT
7: ATF
8, 28, 38, 48: Brush
10: Torque converter
12: Transmission
14: Driving shaft
16: Output shaft
17: Differential gear
18: Driving wheel
20, 30, 40, 50: Sliding surface
21, 31, 41, 51: Slit
22, 32, 42: Convex portion
24: Lead wire
D: Slit depth
L: Distance to lead wire connection portion

The invention claimed is:

1. A carbon grounding brush comprising:
   a sintered body of carbon having a shape of a rectangular cuboid, wherein
   a sliding surface of the sintered body is configured to slide on and ground a driving shaft transmitting a driving force and be exposed to an insulating liquid,
   said sliding surface is provided with at least a slit,
   at least one end of said slit is extended to at least one side of the sliding surface, and
   the slit is configured to introduce into the slit the insulating liquid pressed by rotation of the driving shaft towards the sliding surface and discharge the insulating liquid from the one end.

2. The carbon grounding brush according to claim 1, configured to discharge electrical charges occurring on the driving shaft.

3. The carbon grounding brush according to claim 1, wherein a lead wire is attached to another surface of the carbon grounding brush than the sliding surface, and
   wherein said slit has a depth of not less than 0.5 mm from said sliding surface to a bottom of the slit.

4. The carbon grounding brush according to claim 3, wherein the slit has a depth of not less than 3 mm and not more than 20 mm from the sliding surface to the bottom of the slit.

5. The carbon grounding brush according to claim 1, wherein a plurality of said slit is provided in a grid pattern on the sliding surface.

6. The carbon grounding brush according to claim 2, wherein the insulating fluid is automatic transmission fluid (ATF) in an automatic transmission (AT) of a motor vehicle.

7. The carbon grounding brush according to claim 1, wherein both ends of the slit are located on two different sides of the sliding surface.

* * * * *